C. B. BILLINGHURST.
DEVICE FOR CONTROLLING SHOCK.
APPLICATION FILED JUNE 21, 1915.
1,216,931.
Patented Feb. 20, 1917.
SHEETS—SHEET 1.
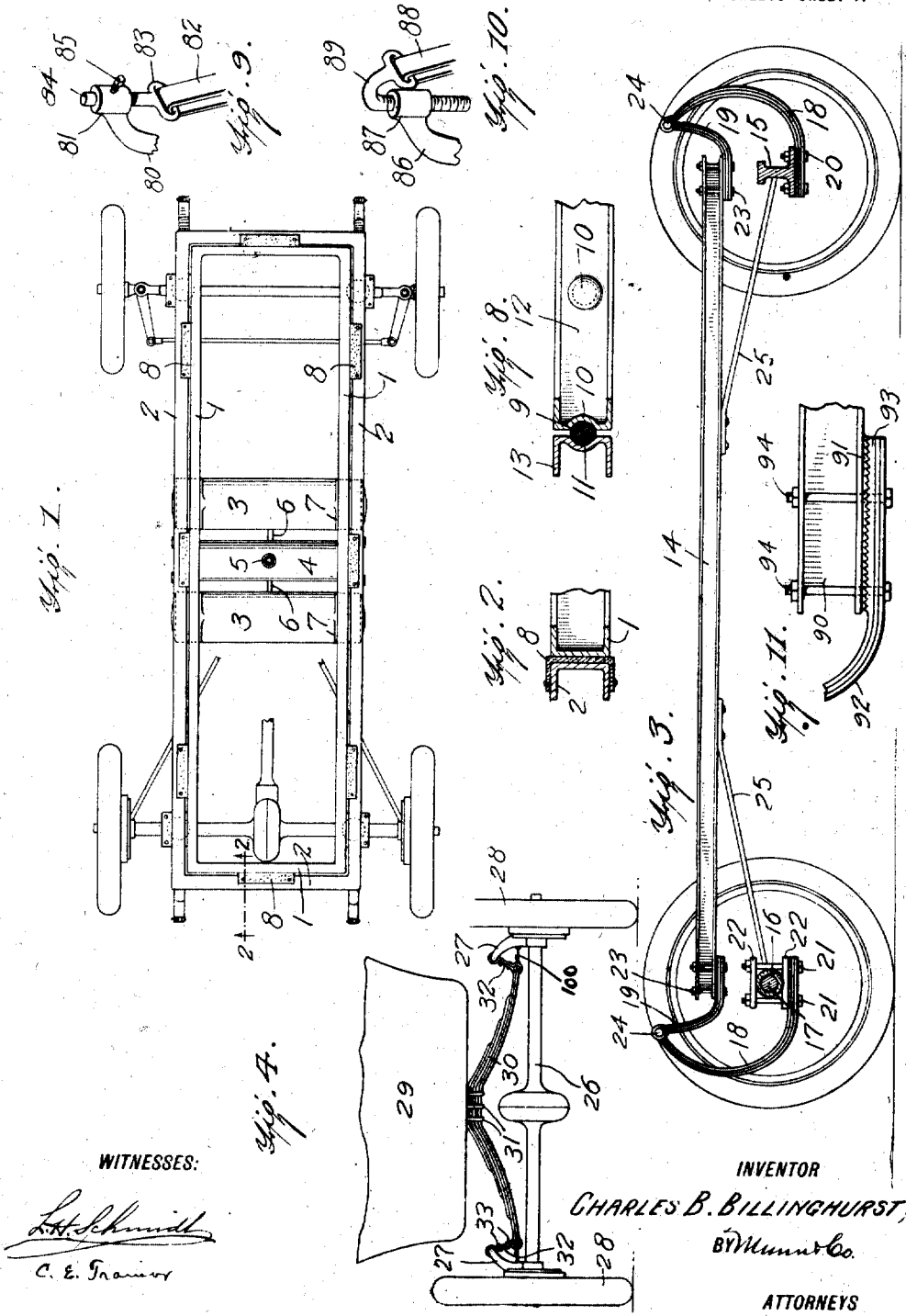
WITNESSES:
INVENTOR
CHARLES B. BILLINGHURST,
BY Munn & Co.
ATTORNEYS

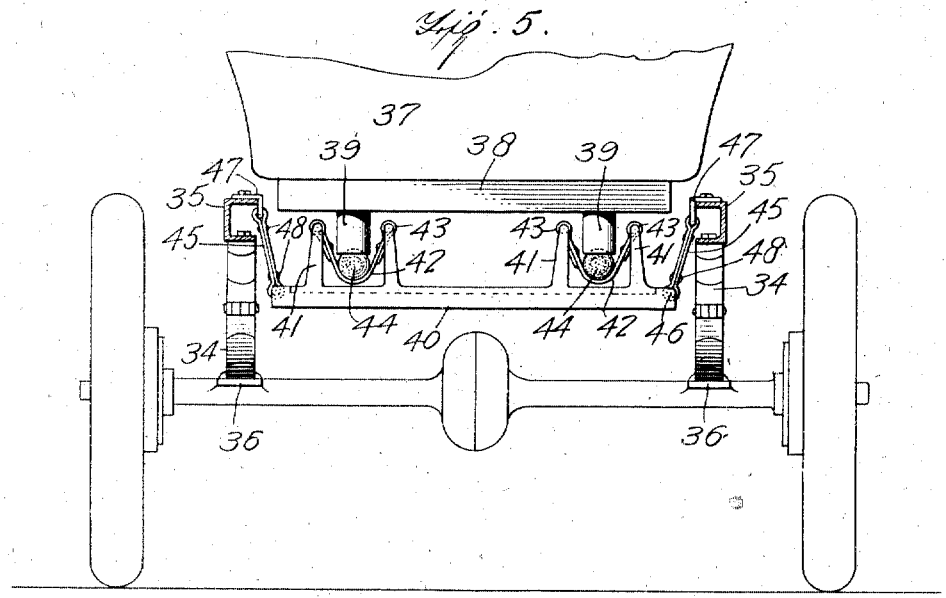
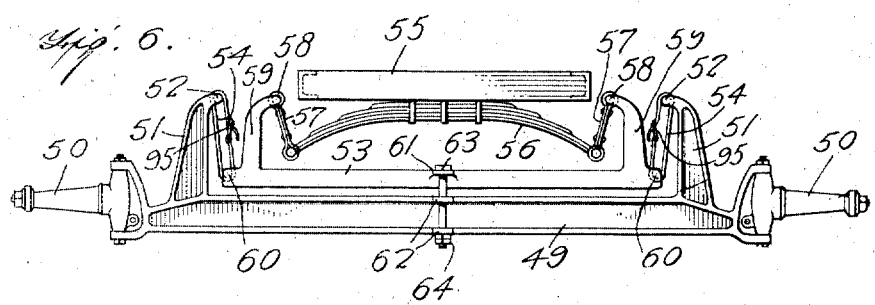
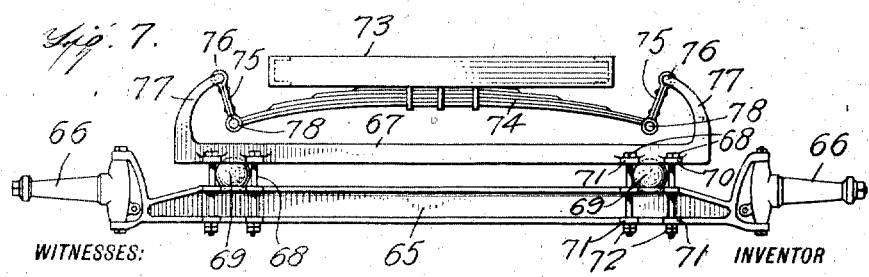

UNITED STATES PATENT OFFICE.

CHARLES B. BILLINGHURST, OF PIERRE, SOUTH DAKOTA.

DEVICE FOR CONTROLLING SHOCK.

1,216,931.

Specification of Letters Patent.

Patented Feb. 20, 1917.

Application filed June 21, 1915. Serial No. 35,269.

*To all whom it may concern:*

Be it known that I, CHARLES B. BILLINGHURST, a citizen of the United States, and a resident of Pierre, in the county of Hughes and State of South Dakota, have invented certain new and useful Improvements in Devices for Controlling Shock, of which the following is a specification.

My invention is an improvement in devices for controlling shock, and the invention has for its object to provide mechanism for use in connection with motor vehicles, of every character, for absorbing shock and jar resulting from the movement of the vehicle over the road, wherein an improved form of hanger connection is provided for interposition between the body and the frame of the vehicle, or between the frame and the axles of the vehicle.

In the drawings,

Figure 1 is a top plan view of an automobile provided with the improved device;

Fig. 2 is an enlarged section on the line 2—2 of Fig. 1, looking in the direction of the arrows adjacent to the line;

Fig. 3 is a side view with parts in section, of a modified construction;

Fig. 4 is a partial end view, of another modified construction;

Fig. 5 is a rear view, partly in section, of another embodiment of my invention;

Figs. 6 and 7 are front views of other embodiments of the invention, and

Fig. 8 is a sectional view similar to Fig. 2, showing a modified form of abutment, and Figs. 9, 10 and 11 are detail views, showing various methods of providing for adjustment of the strap hangers.

In the present embodiment of the invention, the improved hanger is especially designed for use in connection with the subject matter of my co-pending application, Serial No. 861,045, filed September 10, 1914, for supporting the outer member or frame of the chassis of the vehicle, that is, for connecting the said outer member and the frame with the axles of the vehicle, or with the springs arranged between the axles and the said outer member or frame.

As in the said prior application, inner and outer frames 1 and 2 are provided, the frames being open rectangular frames, and the inner frame being of such size that it may fit loosely within the outer frame. The inner frame is connected with the body of the vehicle, and the outer frame is supported by the axles. The frames are of channel material, as shown in Fig. 2, with the channel arranged inwardly for the inner frame and outwardly for the outer frame. A pair of resilient tanks or reservoirs 3 of cylindrical form are supported by the outer frame in any suitable or desired manner, and a cylindrical tank or reservoir 4 of rigid material is arranged between the tanks or reservoirs 3, the said receptacles being spaced apart to receive the tank or reservoir 4 between them.

The tank or reservoir 4 is supplied with fluid under pressure from a suitable source, the fluid under pressure being admitted by way of an inlet pipe 5, and the said tank or reservoir 4 is connected to the reservoirs 3 by a flexible connection 6, so that the pressure in the said reservoirs 3 is the same as that in the reservoir 4. The inner frame 1 rests upon the reservoirs 3, the said frame having saddles 7 secured thereto, which engage the reservoirs 3 near the ends thereof. The reservoirs 3 are of flexible and elastic material, as for instance, rubber and canvas, such as is used in the manufacture of pneumatic tire shoes, and the connections 6 are always open so that the fluid under pressure may flow freely from the central to the lateral tanks or reservoirs.

A check valve is arranged in the inlet pipe 5, to prevent the return of the air from the tank 4 and it will be evident that any shock or jar imparted to the outer frame 2 will be absorbed by the resilient connection between the two frames, so that such shock or jar will not be imparted to the inner frame and the body of the vehicle.

Preferably, buffers or abutments of resilient material are arranged between the frames to prevent clashing when the vehicle is in motion, and such buffers may be sheets 8 of felt or like material arranged as shown in Figs. 1 and 2, or the buffers may be balls 9 of rubber or the like, as shown in Fig. 8. The sheets 8 of felt are connected with the outer frame, and they are arranged at the sides and ends of the frame. The balls 9 are seated in recesses 10 and 11, respectively, in the inner and outer frames 12 and 13, the recesses being arranged in register, so that each ball is partly in the recess of one frame and partly in the recess of the other.

It will be evident that while the sheets of felt, or rubber balls will permit the frames to move vertically slightly with respect to each other sufficient to cushion any shock or jar, yet they will prevent any clashing of the frames with each other.

The manner of connecting the outer frame with the wheels, that is, with the axles or with the springs on the axles, may be varied, as shown in the several constructions of the drawing, as for instance, in Fig. 3, the outer frame 14 corresponding to the frame 2 in Fig. 1, is connected to the front axle 15 and the housings 16 of the rear axle 17, by means of leaf or laminated springs 18 of curved form, and strap hangers 19 of leather or the like.

The springs 18 are connected to the front axle 15 by bolts and nuts 20, and to the housing of the rear axle by bolts and nuts 21. At each axle the large end of the spring is arranged beneath the axle, and at the front axle the bolts are passed directly through the end of the spring and through the flanges at the bottom of the axle, and are engaged by the nuts above the flanges.

At the rear axle, clamping plates 22 are arranged above and below the housing of the axle, and the bolts are passed through the large end of the spring, and through the clamping plates and are engaged by the nuts above the uppermost plate. In either case, one end of the spring is rigidly connected to the axle or to the housing, and the springs may be of any desired number of leaves, and size of leaf, the size and number depending upon the weight to be supported by the spring.

The springs taper slightly from the axle toward their outer ends, and the strap hangers 19 are arranged between the outer or upper ends of the springs and the outer frame 14. The hangers are connected to the frame by bolts and nuts 23, and they are connected to the springs by hinge connections 24. As shown, the springs arch outwardly and upwardly and slightly inwardly to their connection with the outer ends of the strap hangers, and the outer frame is thus supported or suspended above the axles.

Preferably the frame is braced against the front axle and the housing of the rear axle by braces 25, the said braces being connected at one end to the frame at each side thereof, and at the other end to the axle or housing, as the case may be. The braces are to limit the relative movement of the frames with respect to the axle, and to prevent the outward movement of the axles beyond the ends of the frame.

In Fig. 4, the housing 26 of the rear axle, and the front axle (not shown) are provided with integral hanger arms 27, the said arms extending upwardly from near the wheels 28 and curving inwardly to a point above and to the inner side of the connection between the arms and the housing. The body 29 of the vehicle is provided with semi-elliptical leaf springs 30, which are secured to the body at the center thereof by U-shaped clips 31, and the strap hangers 32 are arranged between the arms 27 and the ends of the springs.

As shown in Fig. 4, each strap hanger is in the form of a loop having eyes at the ends, one of which engages the arms 27, and the other the end of the spring. Intermediate the eyes, the portions of the strap are secured together by rivets 33. The inner upper ends of the arms are spaced far enough inwardly beyond the lower outer ends, to permit free expanding movement of the spring, and the ends of the spring are supported for swinging movement by the hangers.

It will be evident that when downward movement of the body occurs, the spring 30 will flatten, the ends moving outward while the central portion moves downward.

In Fig. 5, elliptical leaf springs 34 are arranged between the outer frame 35 and the housing 36 of the rear axle. Each spring rests at its under side on a seat on the housing, and the upper side is secured to the frame as shown. The body 37 of the vehicle is supported by the frame 38 which is provided with depending standards or sockets 39.

A swinging bolster 40 is connected to the side members of the frame 35 by strap hangers to be described. The said bolster is provided near each end with a pair of upstanding arms or brackets 41. These arms have eyes in their upper ends, and the eyes of each pair of arms are connected by a strap 42 of flexible material, as for instance, leather. The ends of the straps 42 have eyes 43 or loops which engage the eyes of the arms 41, and a hollow ball or sphere 44 is arranged between each strap 42 and the adjacent socket 39. The balls or spheres 44 are of the same material as the tanks or reservoirs 3 before mentioned, and they may contain fluid under pressure if desired.

The straps 42 are of such length that the central portion thereof will depend almost to the upper face of the swinging bolster, and the said upper face of the bolster is recessed as indicated in dotted lines. The lower end of each socket 39 is recessed to receive the adjacent ball or sphere, and the body is thus supported by the balls or spheres.

Each of the strap hangers 45 is of leather or like material doubled upon itself to form an eye at each end, and one eye of each hanger engages a transverse pin 46 at the adjacent end of the swinging bolster. The other eye of each hanger engages an opening in one end of an angle bracket 48 which is secured to the adjacent side of the frame 35. Rivets 47 are provided for securing the portions of the strap together at the inner sides of the eyes.

In the above construction, the swinging bolster may move longitudinally, swinging on the strap hangers 45, and it will be noticed that the bolster is supported at approximately the center of the elliptical springs, so that the said springs do not interfere with the swinging movement of the bolster. The body is cushioned against the bolster by the balls 44 and the frame 35 is cushioned against the front axle and the housing of the rear axle by the elliptical springs 34. The frame 35 corresponds to the outer frame of Fig. 1, while the swinging bolster 40 corresponds to the inner frame. This bolster may be connected by integral side members if desired to form a rectangular frame.

In Fig. 6 the front axle 49 having the spindles 50 pivoted to the ends thereof, is provided on the inner sides of the spindles with upstanding standards 51. Each of these standards 51 is provided at its upper end with an inwardly offset eye 52, and a swinging bolster 53 is arranged just above the axle. The swinging bolster is connected to the standards 51 by strap hangers 54, and the frame 55, corresponding to the frame 1 of Fig. 1, is connected to the bolster by means of semi-elliptical leaf springs 56 and strap hangers 57.

The springs 56 are secured to the frame transversely thereof and at or near the ends, and each strap hanger 57 is connected at one end to the adjacent end of the spring 56. The other end of each hanger 57 engages an inwardly offset eye 58 of a standard or upright 59 extending upwardly from the adjacent end of the bolster 53. The strap hangers 54 and 57 are similar and are similar to the strap hanger 45 of Fig. 5.

It will be noted that the swinging bolster 53 is provided at each end with a transverse pin 60 for engagement by the lower eye of the adjacent strap hanger. The said bolster is also provided intermediate its ends with a laterally extending perforated lug 61, and the axle is provided with a pair of similar lugs 62, the lugs 61 and 62 being in register. A bolt 63 is passed downwardly through the openings in the lugs and is engaged by nuts 64 below the lowermost lug of the axle. This bolt limits the upward movement of the swinging bolster, and prevents longitudinal or lateral swinging movement of the said bolster. The bolt acts as a guide for the bolster, constraining it to move directly upward and downward.

The spring 56 cushions the vehicle against the axle, and it will be noticed that the arrangement at the rear axle is the same, the standards 51 being however, connected with the housing of the rear axle.

In Fig. 7, the front axle 65 having the spindle 66 pivoted to the ends thereof, connected yieldingly to a bolster 67 arranged directly above the axle by means of bolts 68 and resilient balls or spheres 69. These balls or spheres 69 are similar to the balls or spheres 44 of Fig. 5, and act in the same manner. The bolts 68 are passed through registering lugs 70 and 71 on the bolster 67 and the axle 65, and they are engaged by nuts 72 below the axle. The balls or spheres 69 are received in recesses in the under face of the bolster and in the upper face of the axle, and it will be evident that the bolster may move downward toward the axle, compressing the balls. The bolts 68 guide the bolster in its movement.

The outer frame 73 is connected to the bolster by means of semi-elliptical leaf springs 74. The ends of the springs are engaged by strap hangers 75 similar to the hangers 54—57—45, and the upper end of each strap hanger is connected to an eye 76 on an arc-shaped standard extending upwardly and inwardly from the outer end of the bolster. The lower end of each strap hanger is hinged to the adjacent end of the spring, as indicated at 78, and it will be evident that when the spring 74 is flattened the ends thereof may move outwardly, swinging on the strap hangers. The frame 73 is cushioned against the bolster, and the bolster is cushioned against the axle.

It has been found in actual use that pneumatic cushions do not give entire satisfaction alone. The best results have been obtained by the combination of metallic springs and air cushions. In the different constructions shown this combination is retained intact, the air cushions being merely combined with the metallic springs, and the cushion or pneumatic tires are also retained. Thus in Fig. 5 there will be three points of cushioning, namely at the contact with the supporting surface of the vehicle, between the axle and the swinging bolster, and between the bolster and the body of the vehicle.

In Fig. 3 there are three points of cushioning in the same manner, and similarly arranged, and in each case the metallic springs are arranged between the air cushions. The non-metallic straps 19, 32, 45, 54, 57 and 75, because of their non-metallic character, possess shock eliminating qualities. A non-metallic connection is always a shock breaker, since it does not transmit shock or jar as does a metallic connection, and in each construction the shock eliminating strap hanger is interposed between the axle and the body of the vehicle.

While the straps are shown as connected by rivets, it is obvious that any other method of connection might be provided. Provision must also be made for taking up any slack that may occur in the system of straps. This can be done in any suitable or desired manner, as for instance, in Fig. 9, wherein the hanger 80 has a head or vertical bearing 81. The strap hanger 82 is connected with the eye 83 at the lower end of the rod or bolt 84 which is mounted to slide on the head or bearing and is held in adjusted position by a set screw 85.

Or, the construction shown in Fig. 10 may be used, wherein the hanger 86 has the head or bearing 87 similar to the bearing 81 of Fig. 9, and the hanger 88 is connected with the eye of one end of a U-shaped bolt 89. The other end of the bolt is threaded through the head or hanger, and it will be obvious that by turning the bolt in the proper direction it may be raised and lowered with respect to the hanger.

In Fig. 11, a method of adjusting the hangers as in Fig. 3 is shown. In this construction the frame 90 has a ratchet bar 91 secured to the under face thereof, at each corner. The strap hanger 92 corresponding to the hanger 19 of Fig. 3 is provided with a second ratchet bar 93 whose teeth fit the teeth of the ratchet bar 91. The bolts and nuts 94 which connect the strap hanger to the frame pass also through the ratchet bars 91 and 93. The bar 93 and the strap hangers will have longitudinally extending slots, or a longitudinally extending series of openings, to permit the bar 93 and the strap hanger to be adjusted with respect to the bar 91.

In Fig. 6 is shown another method of adjusting wherein the strap hangers 54 are in the form of endless loops, the loop being formed from a strap having at one end a buckle 95 through which is passed the other end of the strap. Many other forms of adjustment could be provided. It will be understood that the devices may be used with or without pneumatic tires.

It will be noted from an inspection of Fig. 4, that straps 100 are arranged between the ends of the spring 30 and the bases of the standards 27, each of the straps being provided at one end with a buckle and at the other end with openings for engaging the tongue of the buckle, and the straps will pass through eyes on the end of the spring and on the standards, to prevent side sway of the vehicle body. It will be understood that similar straps may be arranged wherever it is necessary or desirable to prevent side sway.

I claim:

1. In a motor vehicle, the combination with the axles and the body, said axles having uprights or standards near their ends, and flexible hangers of non-elastic material connected with the standards, and metallic springs connected to the body and arranged between the body and the hangers and connecting the hangers to the body, and means for connecting the springs to the hangers.

2. In a motor vehicle, the combination with the axles and the body, bolsters arranged above the axles and connected therewith, said bolsters having upwardly extending standards, springs arranged between the body and the bolsters, and hangers connecting the springs to the standards, said hangers being of flexible non-elastic material.

3. In a motor vehicle, the combination with the axles and the body, said axles having uprights or standards near their ends, and flexible hangers of non-elastic material connected with the standards, and metallic springs connected to the body and arranged between the body and the hangers and connecting the hangers to the body, means for connecting the springs to the hangers, and means in connection with the mounting of the hangers for permitting the effective length of the hangers to be varied.

4. In a motor vehicle, the combination with the axles and the body, bolsters arranged above the axles and said bolsters having upwardly extending standards, and springs arranged between the body and the bolsters, hangers connecting the springs to the standards, said hangers being of flexible non-elastic material, and means in connection with the mounting of the hangers for permitting the effective length of the hangers to be varied.

5. In a motor vehicle, the combination with the axles and the body, of bolsters arranged above the axles, said bolsters and axles having upwardly extending standards, springs arranged beneath the body, hangers of non-elastic flexible material connecting the springs to the standards on the bolsters, flexible non-elastic hangers connecting the bolsters and the standards to the axles, said hangers sustaining the springs and the bolster, and means in connection with the hangers permitting the effective length thereof to be varied.

CHARLES B. BILLINGHURST.